United States Patent [19]
Willis

[11] Patent Number: 6,145,861
[45] Date of Patent: Nov. 14, 2000

[54] TRAILER HITCH STEP

[76] Inventor: Timothy G. Willis, 310 Evergreen, Yreka, Calif. 96097

[21] Appl. No.: 09/217,397

[22] Filed: Dec. 21, 1998

[51] Int. Cl.⁷ ........................................................ B60R 3/00
[52] U.S. Cl. ........................ 280/163; 280/164.2; 280/511
[58] Field of Search ................................ 280/163, 164.1, 280/164.2, 165, 166, 169, 511; 4/507

[56] References Cited

U.S. PATENT DOCUMENTS

| | | | |
|---|---|---|---|
| 3,471,070 | 10/1969 | Olson | 224/489 |
| 3,580,613 | 5/1971 | Northrop | 280/500 |
| 3,588,160 | 6/1971 | Reiner | 293/119 |
| 3,675,947 | 7/1972 | Blagg | 280/500 |
| 3,682,360 | 8/1972 | Fletcher et al. | 224/491 |
| 3,716,254 | 2/1973 | Tarvin | 280/166 |
| 3,717,362 | 2/1973 | Johnson | 280/416.1 |
| 3,730,556 | 5/1973 | Aldape et al. . | |
| 3,779,580 | 12/1973 | Thelen . | |
| 3,794,345 | 2/1974 | Locke . | |
| 3,858,905 | 1/1975 | Peebles . | |
| 3,866,949 | 2/1975 | Green | 280/507 |
| 4,194,754 | 3/1980 | Hightower | 280/166 |
| 4,266,817 | 5/1981 | Mason et al. | 293/117 |
| 4,576,395 | 3/1986 | Longoria . | |
| 5,340,177 | 8/1994 | Maxam | 293/117 |
| 5,358,269 | 10/1994 | Jakeman et al. | 280/490.1 |
| 5,702,118 | 12/1997 | Hanson et al. | 280/491.5 |
| 5,738,362 | 4/1998 | Ludwick | 280/166 |
| 5,947,506 | 9/1999 | Bauer | 280/507 |

FOREIGN PATENT DOCUMENTS

| | | | |
|---|---|---|---|
| 2242659 | 10/1991 | United Kingdom | 280/163 |

*Primary Examiner*—Brian L. Johnson
*Assistant Examiner*—Matthew Luby
*Attorney, Agent, or Firm*—Flehr Hohbach Test Albritton & Herbert

[57] ABSTRACT

A step assembly (10) including a top step plate (12) for mounting to a ball mount tongue (32), and clamped thereto by means of a pair of adjustable clamp plates (14) releasably secured to top plate (12) by four carriage bolt assemblies (20). Top plate (12) includes a central channel (29) that allows top plate (12) to straddle tongue (32) and clamp plates (14) include step-downs (46, 48, 50), which engage the side edges of tongue (32) and thereby securely clamp top plate (12) to the tongue.

10 Claims, 5 Drawing Sheets

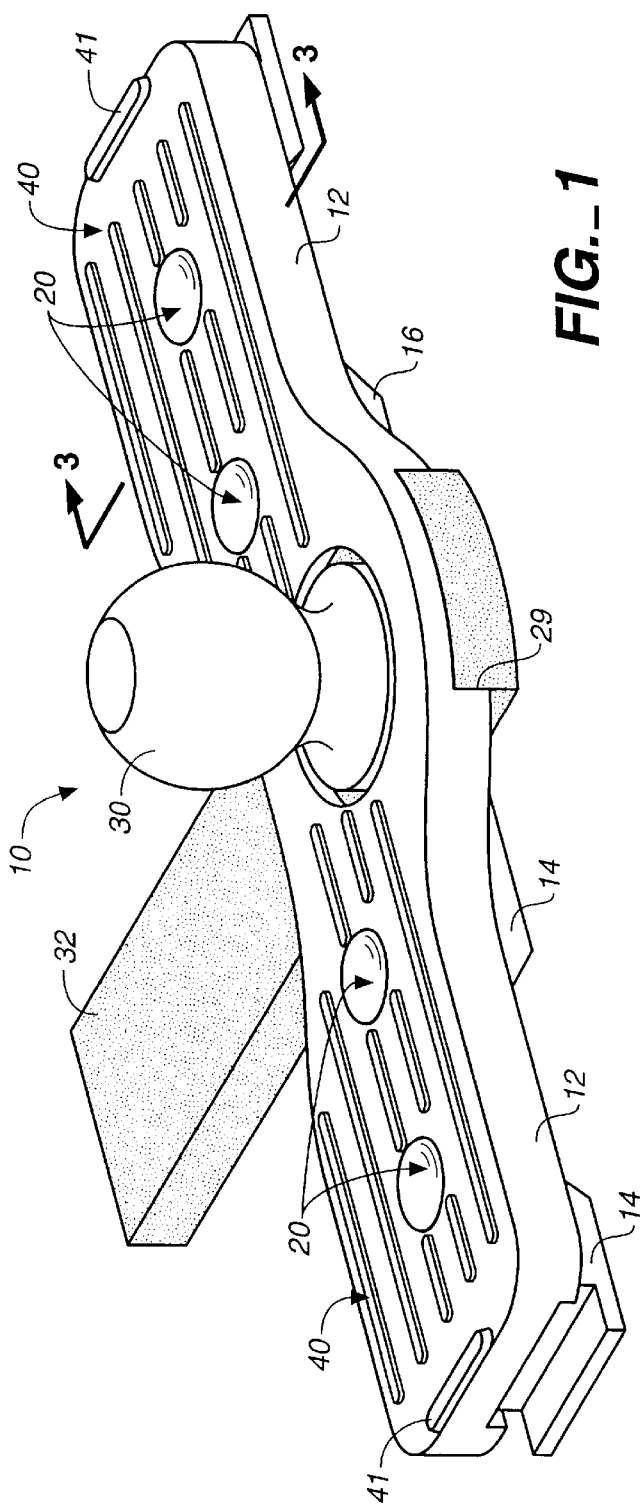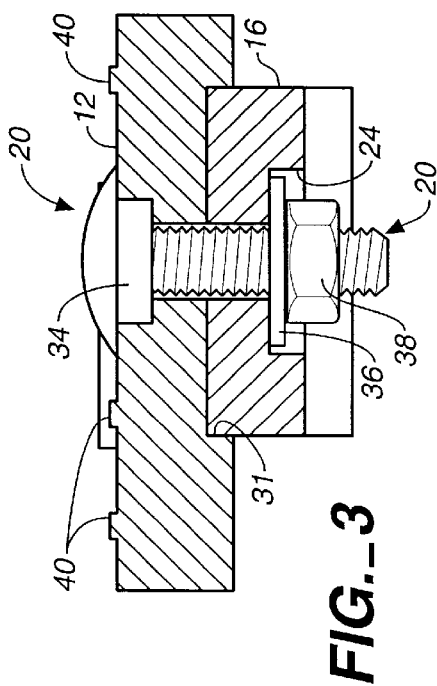

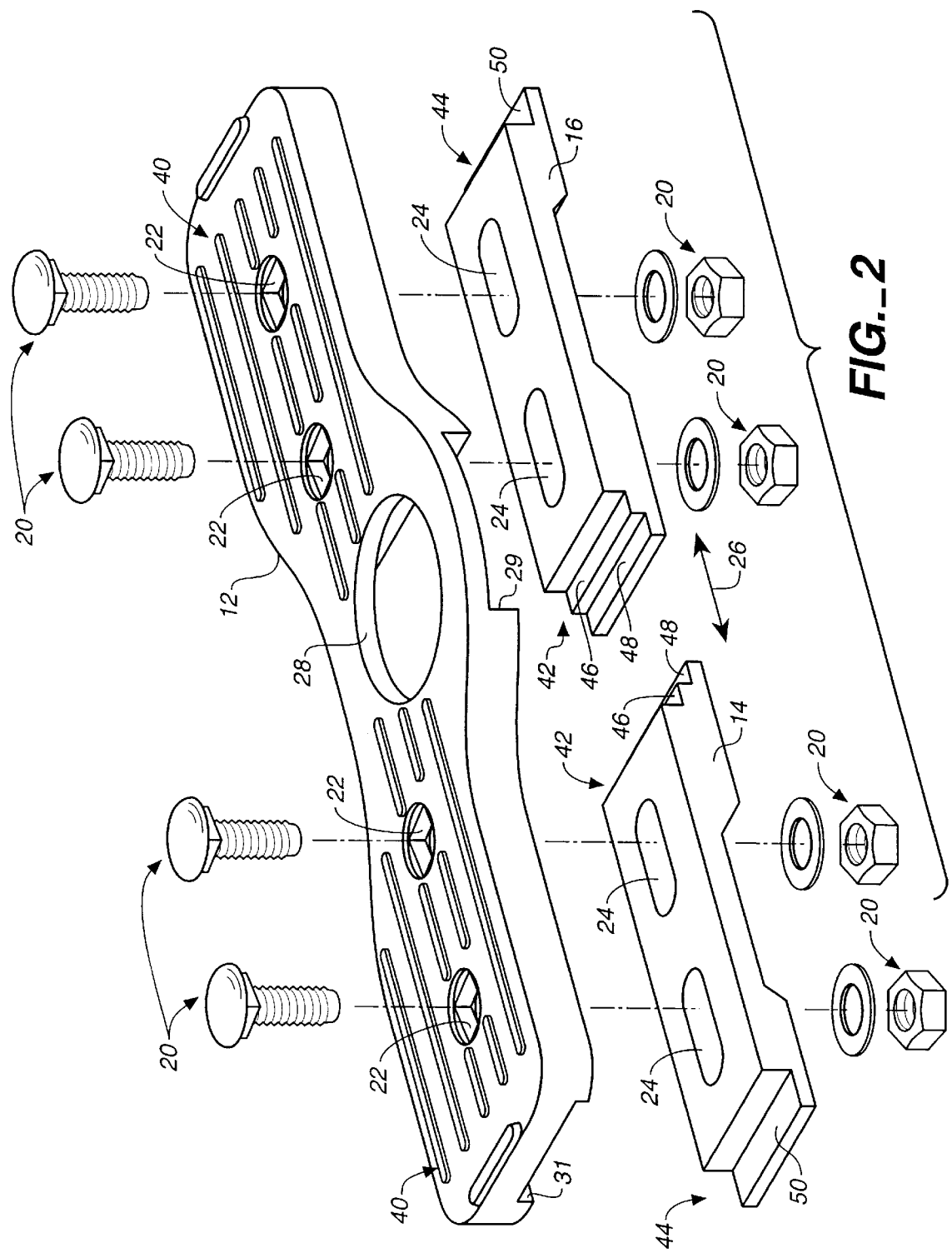
FIG._2

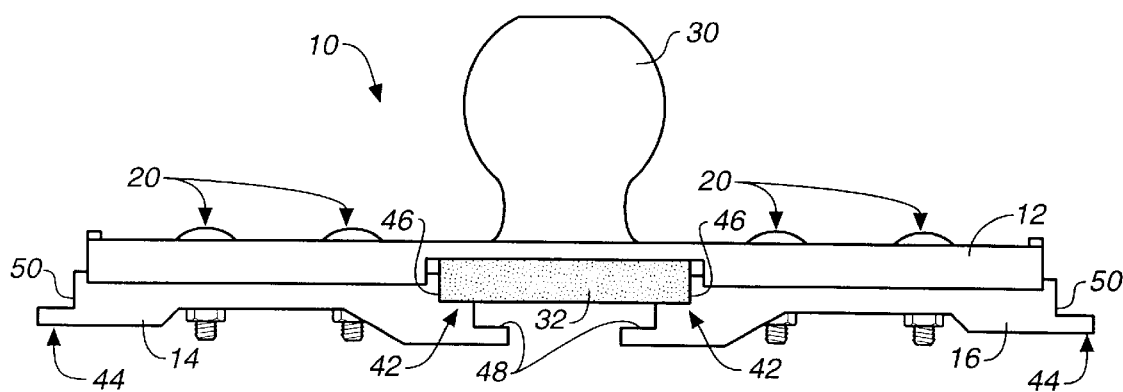
FIG._4A
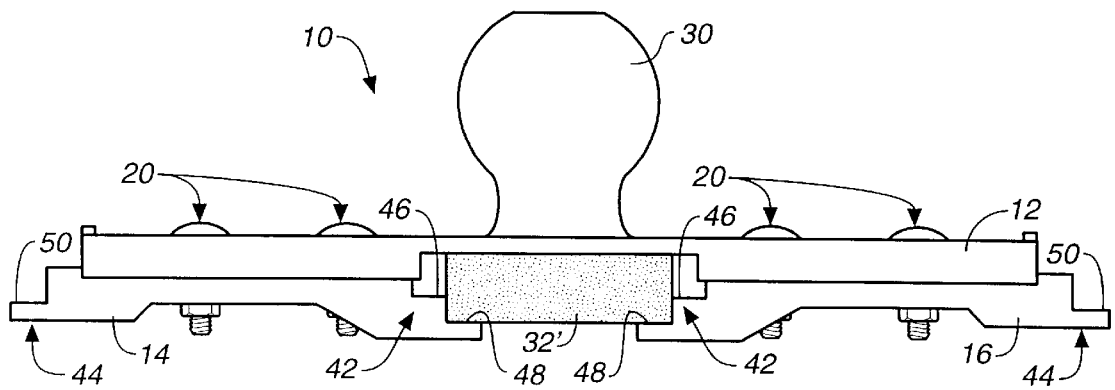
FIG._4B
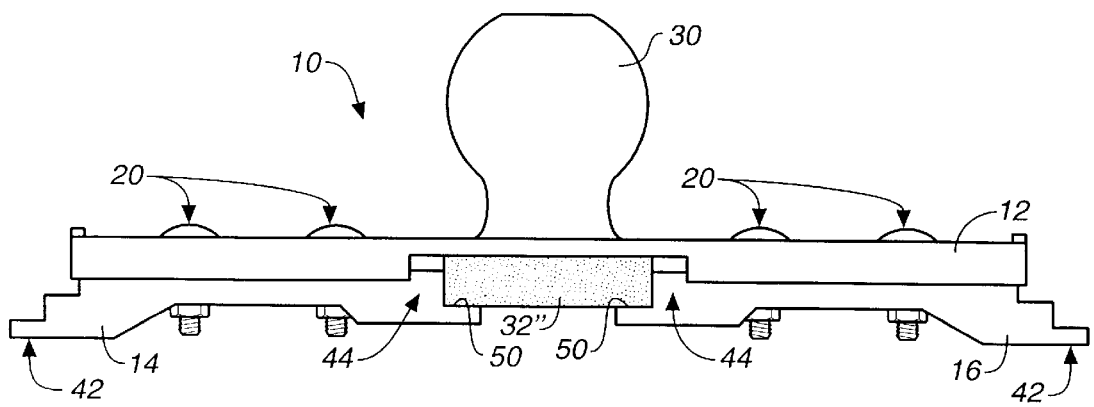
FIG._4C

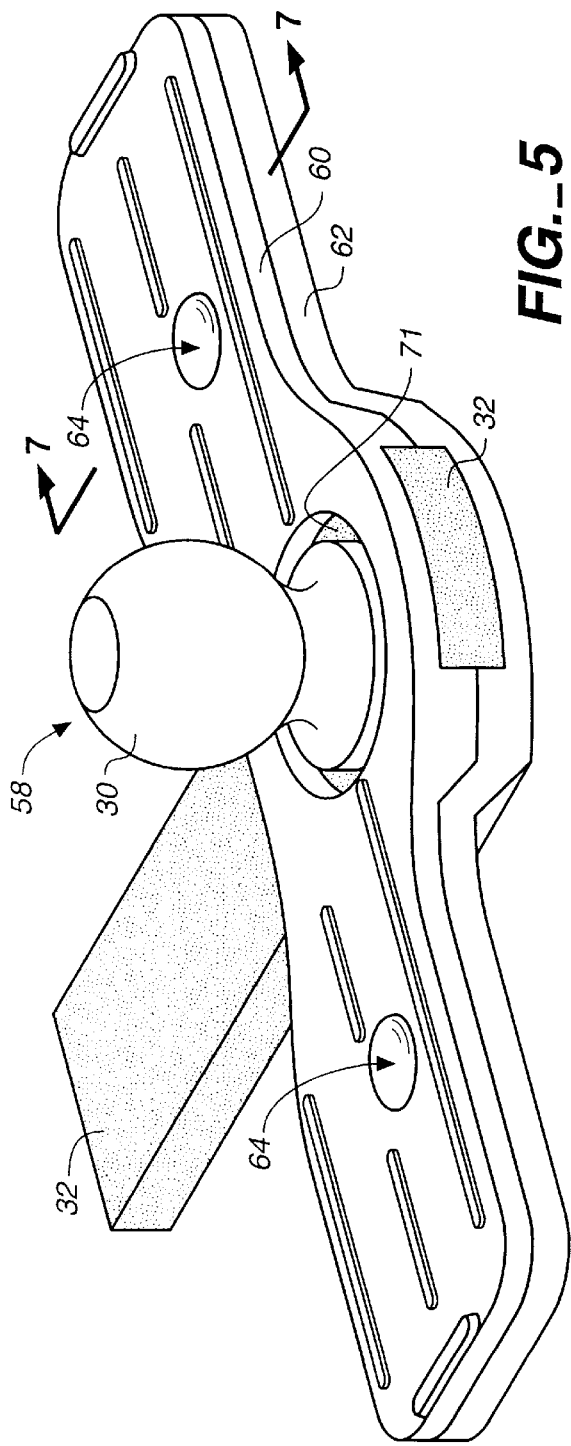
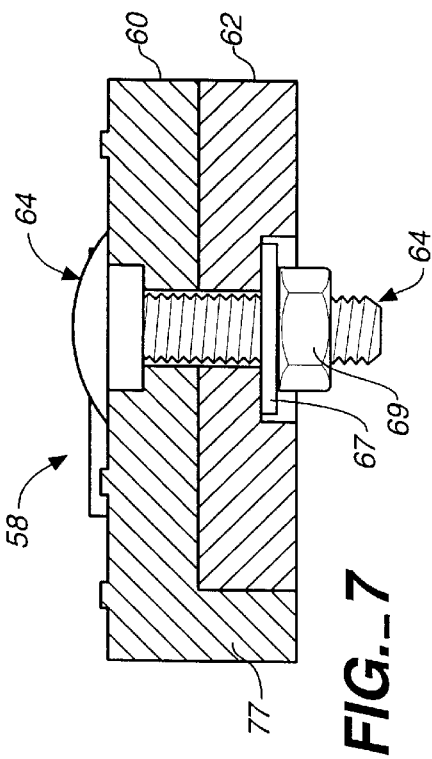

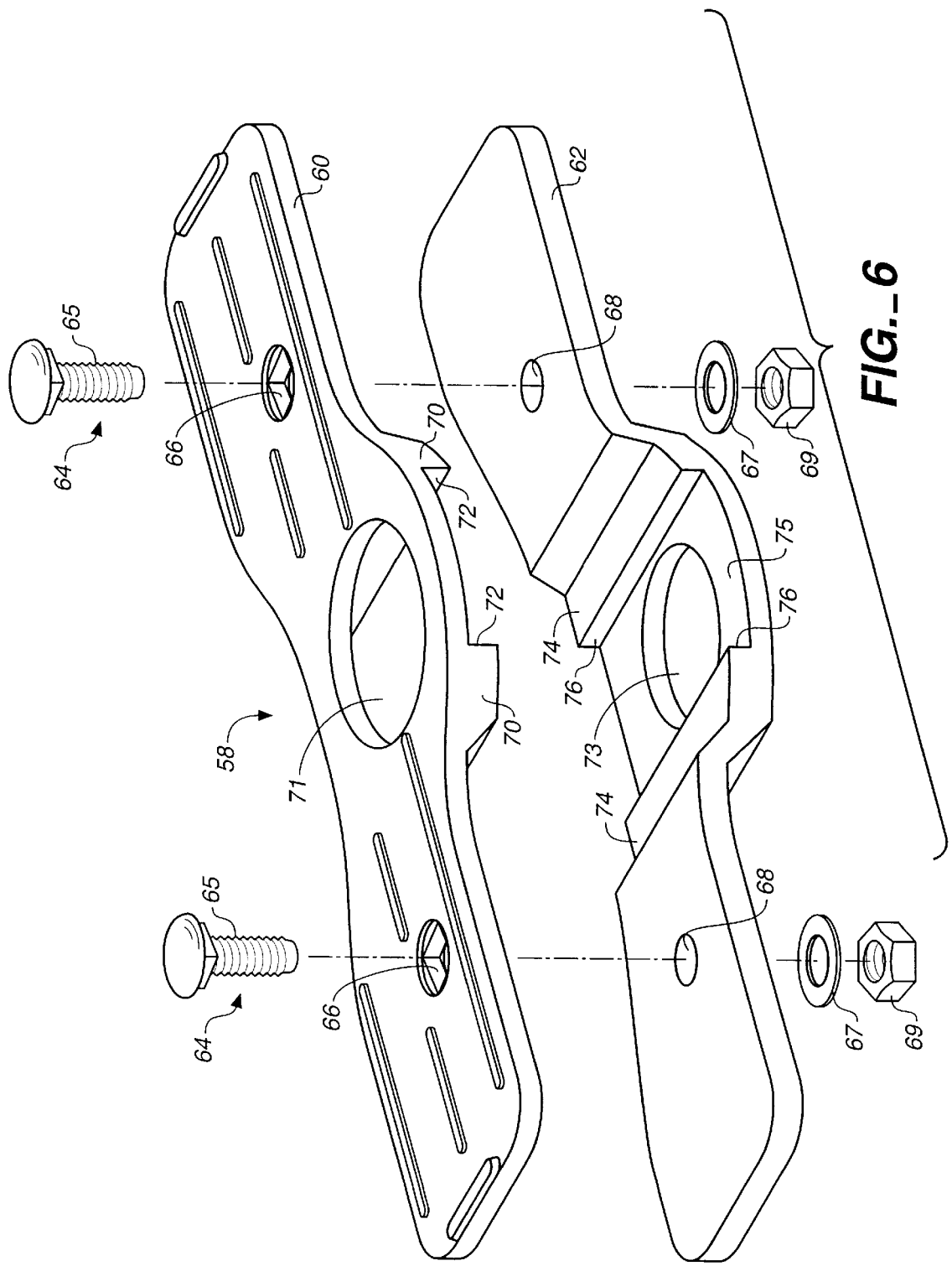

TRAILER HITCH STEP

TECHNICAL FIELD

The present invention relates to a trailer hitch step that is an attachment to a conventional ball mount tongue of a trailer hitch for providing an elevated step for a person to step up on in order to reach the cargo area or roof of a vehicle.

BACKGROUND ART

U.S. Pat. No. 5,738,362 of Ludwick discloses a rotating step for a receiver-type trailer hitch that provides an easy to use step to aid persons in entering, leaving and loading the rear cargo and roof area of a vehicle. The step attachment includes a laterally extending step surface (26) that is rotatably secured by an upright post (28) to a short, rectangular box-beam mount (16), that is in turn inwardly and outwardly adjustably secured within a hollow rectangular receiver 12 of the trailer hitch. The step surface (26) rotates inwardly, as shown in FIG. 3, to a storage, non-use position, and outwardly, as shown in FIG. 2, to an easily accessible position.

The '362 patent of Ludwick also includes an informative discussion of the need for improved steps for the rear of vehicles and attempts by others to provide them.

The purpose of the present invention is to provide a similar step mechanism for reaching the roof of a vehicle, but the present invention is designed for a different type of trailer hitch mount.

DISCLOSURE OF INVENTION

Briefly described, the step assembly of the present invention includes an elongated, laterally extending step plate having sufficient length to provide a step surface on both sides of a ball mount tongue of a trailer hitch when secured thereto, a pair of movable clamp plates for engaging side edges of the tongue on the underside of the step plate, one on each side of the tongue, and means for securing the clamp plates to the step plate in a manner engaging the clamp plates with the side edges of the tongue and thereby firmly securing the step plate to the tongue in a manner capable of supporting the weight of a person on the step plate.

According to an aspect of the invention, the clamp plates are movable in a sliding manner and include side edge notches having contours matching the side edge contours of the tongue in order to create a firm engagement between the clamp plates and the tongue.

According to another aspect of the invention, each clamp plate includes more than one side edge notch. Preferably, each end of the clamp plates includes side edge notches. It is also preferable for the side edge notches at each end of the clamp plates to be of different sizes so that the clamp plates can accommodate different size trailer hitch tongues.

According to another embodiment of the invention, the step assembly includes an elongated, laterally extending step plate having sufficient length to provide a step surface on both sides of a ball mount tongue of a trailer hitch when secured thereto, a bottom plate adapted to secure to the top plate in a tight fitting manner, and means for securing the bottom plate to the step plate in a manner engaging the bottom plate with the side edges of the tongue and thereby firmly securing the step plate to the tongue in a manner capable of supporting the weight of a person stepping on the step plate.

According to an aspect of this embodiment of the invention, the step plate includes a downward extension for engaging the bottom plate and stabilizing the step plate.

The downward extension is provided along a portion of the step plate on each side of the tongue, and extends down the back edge of bottom plate to stabilize the step plate on the bottom plate and prevent any rotation or lateral shifting of the step plate.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a pictorial view of a first embodiment of the trailer hitch of the present invention;

FIG. 2 is an exploded view of the trailer hitch of FIG. 1;

FIG. 3 is a sectional view taken along the line 3—3 of FIG. 1;

FIGS. 4A–4C are a series of back elevation views of three different mounting arrangements for the trailer hitch of FIG. 1;

FIG. 5 is a pictorial view of a second embodiment of the trailer hitch of the present invention;

FIG. 6 is an exploded view of the trailer hitch of FIG. 5; and

FIG. 7 is a sectional view of the trailer hitch of FIGS. 5 and 6 taken along the line 7—7 of FIG. 5.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Referring to FIG. 1, a first embodiment of the trailer hitch 10 of the present invention includes an elongated top step plate 12 and a pair of shorter, laterally adjustable clamp plates 14, 16, which are secured to top plate 12 by a series of four carriage bolt and nut assemblies 20. Top plate 12 includes an opening 22 for each carriage bolt and nut assembly 20, with opening 22 having a rectangular shape to provide for self-locking of each carriage bolt to the top plate. Each clamp plate 14, 16 includes a pair of transverse slots 24 that align with an opening 22 in the top plate. Transverse slots 24 receive the carriage bolts of assemblies 20 and allow for lateral adjustment of clamp plates 14, 16 in the direction of arrow 26.

Top plate 12 further includes a central circular opening 28, which allows for positioning of top plate 12 around a circular ball 30 secured at the outer end of a tongue of a hitch mount 32. Top plate 12 also includes a central channel 29 that has a width slightly greater than the width of hitch mount 32 in a manner providing sufficient space to accommodate different size hitch mounts. Top plate 12 further includes a longitudinally extending channel 31 in which the top portions of clamp plates 14, 16 fit to limit lateral misalignment of the clamp plates.

Referring to FIG. 3, the attachment of top plate 12 to clamp plate 16 is shown in section through a carriage bolt assembly 20. A sectional view through clamp plate 14 would be identical. Carriage bolt and nut assembly 20 is shown to include a self-locking carriage bolt 34, washer 36 and locking nut 38. Loosening of nut 38 allows for longitudinal adjustment of clamp plate 16 relative to top plate 12, which is discussed in more detail with reference to FIGS. 4A–4C.

In FIG. 3, it can further be seen that the top surface of top plate 12 includes a series of raised longitudinal ridges 40, which provide a more textured stepping surface to grip the sole of a person's boot, as well as a pair of lateral end ridges 41, which do the same. Different types of surface treatment, of course, can be provided to top plate 12 in order to enhance the grip of a shoe sole. It is an important feature of the invention that top plate 12 have sufficient length to provide a step surface on both sides of the trailer hitch tongue when secured thereto.

Each clamp plate 14, 16 includes a double-stepped end 42 and a single-stepped end 44. Double-stepped ends 42 include an upper notch or step 46 and a lower step 48 and single-step ends 44 include a single notch or step 50. Preferably, the depth of each step relative to the upper side of the clamp plate is different so that tongues of different thickness can be accommodated.

Referring to FIG. 4A, trailer hitch 10 is shown mounted to a ½ inch thick ball mount tongue 32. For this size hitch mount, clamp plates 14, 16 are arranged with their double-stepped ends 42 engaging the side edges of hitch mount 32 and their single-step ends 34 on the outside. The positioning of double-stepped ends 42 to the inside provides for precise engagement of upper steps 46 around the bottom side edge corners of hitch mount 32. In this position, clamp plates 14, 16 firmly grip ball mount tongue 32 due to being tightly clamped to top plate 12 by carriage bolt assemblies 20.

In FIG. 4B, to accommodate a ⅝ thick ball mount tongue 32', side plates 14 and 16 are moved outwardly so that the bottom steps 48 of double-stepped ends 42 precisely fit around the bottom side edge corners of ball mount 32'. For this, carriage bolt assemblies 20 are loosened to adjust the position of clamp plates 14, 16 and then re-fastened.

In FIG. 4C, clamp plates 14, 16 are reversed so that double-stepped ends 42 are to the outside and single-step ends 44 are to the inside. Proper lateral positioning of clamp plates 14, 16 allows the single-steps 50 to precisely fit around the bottom side edge corners of a ¾ inch ball mount tongue 32".

FIGS. 5–7 show a second embodiment for the trailer hitch step 58 of the present invention. Trailer hitch step 58 includes an elongated top plate 60 and a single bottom plate 62 of equal length. Top plate 60 and bottom plate 62 are secured together by a pair of carriage bolt assemblies 64, which include bolts 65, washers 67, and locking nuts 69. Top plate 60 includes a pair of openings 66 for bolts 65 and bottom plate 62 includes a corresponding pair of openings 68. Slots are not provided in bottom plate 62 because trailer hitch step 58 is not meant to be adjustable.

A center opening 71 is provided in top plate 60 and a corresponding center opening 73 is provided in bottom plate 62. Center opening 71 is for receiving a ball mount of a trailer hitch while the purpose of center opening 73 is to receive bolt assembly 64.

Top plate 60 also includes a pair of central, inwardly facing side rails 70 each of which includes an inwardly facing side face 72. Bottom plate 62 includes a correspondingly shaped step-down 74 and a central channel 75 that includes inwardly facing side faces 76 that are spaced apart a distance equal to the spacing of side faces 72 of top plate 60. As shown in FIG. 7, side faces 72, 76 meet with the side edge corners of hitch mount 32 in a manner that closely fit top plate 60 and bottom plate 62 around the hitch mount. The tightening of carriage bolt assembly 64 tightly clamps top plate 60 to bottom plate 62 and both to the hitch mount 32 in a manner that creates a firm and stable stepping platform about the hitch mount 32.

Top plate 60 also includes a rear, downwardly depending lip 77 along a portion of its length on each side of center opening 71. Lip 77 extends down the back edge of bottom plate 62 and is provided in order to stabilize top plate 60 on bottom plate 62 and prevent any rotation or lateral shifting of the top plate. Lip 77 also assists in lining up holes 66 with holes 68 so that carriage bolts 65 are easily inserted therein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

The invention claimed is:

1. A step assembly for a trailer hitch assembly having an outwardly projecting tongue having side edges, comprising:

an elongated, laterally extending step plate having sufficient length to provide a step surface on both sides of the tongue when secured thereto, a pair of movable clamp plates for securing to the underside of the step plate, one on each side of the tongue, and adapted to clamp to side edges of the tongue, and means for securing the clamp plates to the step plate in a manner engaging the clamp plates with the side edges of the tongue and thereby firmly securing the step plate to the tongue in a manner capable of supporting the weight of a person stepping on the step surface of the step plate without support from the trailer hitch assembly remote from the tongue.

2. The step assembly of claim 1 wherein, the clamp plates are laterally movable in a sliding manner.

3. The step assembly of claim 1 wherein, the clamp plate include side edge notches having contours matching the side edge contours of the tongue.

4. The step assembly of claim 2 wherein, each clamp plate includes more than one side edge notch.

5. The step assembly of claim 4 wherein, each end of the clamp plates includes side edge notches.

6. The step assembly claim 4 wherein, the side edge notches at each end of the clamp plates are of different size so that the clamp plates can accommodate different size trailer hitch tongues.

7. The step assembly of claim 1 wherein, the top plate includes an upper surface having raised ridges to improve traction.

8. A step assembly for attachment to a trailer hitch having an outwardly projecting tongue having side edges, comprising:

an elongated, laterally extending step plate having sufficient length to provide a step surface on both sides of the tongue when secured thereto, a bottom plate adapted to secure to the step plate in a tight fitting manner, and means for securing the bottom plate to the step plate in a manner engaging the bottom plate with the side edges of the tongue and thereby firmly securing the step plate to the tongue in a manner capable of supporting the weight of a person stepping on the step plate.

9. The step assembly of claim 8 wherein, the step plate includes an opening through which a ball of the trailer hitch can protrude to position the ball for receiving the hitch of a trailer.

10. The step assembly of claim 9 wherein, the step plate includes a downward extension for engaging the bottom plate and stabilizing the step plate.

* * * * *